(12) United States Patent
Wen et al.

(10) Patent No.: US 7,383,254 B2
(45) Date of Patent: Jun. 3, 2008

(54) METHOD AND SYSTEM FOR IDENTIFYING OBJECT INFORMATION

(75) Inventors: Ji-Rong Wen, Beijing (CN); Wei-Ying Ma, Beijing (CN); Zaiqing Nie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 11/106,383

(22) Filed: Apr. 13, 2005

(65) Prior Publication Data

US 2006/0235875 A1 Oct. 19, 2006

(51) Int. Cl.
*G06F 7/00* (2006.01)
(52) U.S. Cl. ............................................. 707/3; 707/6
(58) Field of Classification Search ............... 707/1–10
See application file for complete search history.

(56) References Cited

U.S. PATENT DOCUMENTS

| 6,460,036 | B1 * | 10/2002 | Herz ........................... 707/10 |
| 6,813,616 | B2 * | 11/2004 | Simpson et al. ................ 707/3 |
| 6,931,595 | B2 * | 8/2005 | Pan et al. ..................... 715/723 |
| 2004/0181749 | A1 * | 9/2004 | Chellapilla et al. ......... 715/505 |

OTHER PUBLICATIONS

Hanna M. Wallach, "Conditional Random Fields: An Introduction," University of Pennsylvania CIS Technical Report MS-CIS-04/21, Feb. 24, 2004.
Arvind Arasu and Hector Garcia-Molina, "Extracting Structured Data from Web Pages," ACM, SIGMOD 2003, San Diego, CA.
Luigi Arlotta, Valter Crescenzi, Giansalvatore Mecca and Paolo Merialdo, "Automatic Annotation of Data Extracted from Large Web Sites," International Workshop on the Web and Databases, Jun. 12-13, 2003, San Diego, CA.
Daniel M. Bikel, Scott Miller, Richard Schwartz and Ralph Weischedel, "Nymble: a High-Performance Learning Name-Finder," Proceedings of ANLP 1997.
Mikhail Bilenko, Raymond Mooney, William Cohen, Pradeep Ravikumar and Stephen Fienberg, "Adaptive Name Matching in Information Integration," Information Integration on the Web, IEEE Intelligent Systems, IEEE Computer Society, 2003, pp. 2-9.
Vinayak Borkar, Kaustubh Deshmukh, and Sunita Sarawagi, "Automatic segmentation of text into structured records," ACM SIGMOD 2001, Santa Barbara, California.

(Continued)

*Primary Examiner*—Wilson Lee
(74) *Attorney, Agent, or Firm*—Perkins Cole LLP

(57) ABSTRACT

A method and system for identifying object information of an information page is provided. An information extraction system identifies the object blocks of an information page. The extraction system classifies the object blocks into object types. Each object type has associated attributes that define a schema for the information of the object type. The extraction system identifies object elements within an object block that may represent an attribute value for the object. After the object elements are identified, the extraction system attempts to identify which object elements correspond to which attributes of the object type in a process referred to as "labeling." The extraction system uses an algorithm to determine the confidence that a certain object element corresponds to a certain attribute. The extraction system then selects the set of labels with the highest confidence as being the labels for the object elements.

18 Claims, 9 Drawing Sheets

OTHER PUBLICATIONS

Sergey Brin and Lawrence Page, "The Anatomy of a Large-Scale Hypertextual Web Search Engine," Computer Science Department, Stanford University, 1998.

Deng Cai, Shipeng Yu, Ji-Rong Wen and Wei-Ying Ma, "Block-based Web Search," SIGIR, Jul. 25-29, 2004, Sheffield, South Yorkshire, UK, ACM 2004.

William W. Cohen and Sunita Sarawagi, "Exploiting Dictionaries in Named Entity Extraction: Combining Semi-Markov Extraction Processes and Data Integration Methods," KDD '04 Seattle, ACM 2004.

C. Lee Giles, Kurt D. Bollacker, and Steve Lawrence, "CiteSeer: An Automatic Citation Indexing System," Digital Libraries '98, Pittsburgh, PA, ACM 1998.

Hui Han, C. Lee Giles, Eren Manavoglu, Hongyuan Zha, Zhenyue Zhang and Edward Fox, "Automatic Document Metadata Extraction using Support Vector Machines," 2003 Joint Conference on Digital Libraries, IEEE 2003.

Nicholas Kushmerick, Daniel S. Weld and Robert Doorenbos, "Wrapper Induction for Information Extraction," IJCAI-97.

John Lafferty, Andrew McCallum and Fernando Pereira, "Conditional Random Fields: Probabilistic Models for Segmenting and Labeling Sequence Data," Proc. 18th International Conference on Machine Learning, 2001.

Kristina Lerman, Lise Getoor, Steven Minton and Craig Knoblock, "Using the Structure of Web Sites for Automatic Segmentation of Tables," 2004, Christoph Veigl, Paper 6, ACM SIGMOD 2004.

Bing Liu, Robert Grossman and Yanhong Zhai, "Mining Data Records in Web Pages," SIGKDD, Aug. 24-27, 2003, Washington DC, ACM 2003.

Andrew McCallum, Dayne Freitag and Fernando Pereira, "Maximum Entropy Markov Models for Information Extraction and Segmentation," ICML, 2000.

Hanna Pasula, Bhaskara Marthi, Brian Milch, Stuart Russell and Ilya Shpitser, "Identity Uncertainty and Citation Matching," NIPS, 2002.

Fuchun Peng and Andrew McCallum, "Accurate Information Extraction from Research Papers using Conditional Random Fields," HLT-NAACL, 2004.

Stephen Della Pietra, Vincent Della Pietra and John Lafferty, "Inducing Features of Random Fields," IEEE Transactions Pattern Analysis and Machine Intelligence, vol. 19, No. 4, Apr. 1997.

Lawrence R. Rabiner, "A Tutorial on Hidden Markov Models and Selected Applications in Speech Recognition," Proceedings of the IEEE, vol. 77, No. 2, Feb. 1989.

Sunita Sarawagi and William W. Cohen, "Semi-Markov Conditional Random Fields for Information Extraction," NIPS 2004.

Kristie Seymore, Andrew McCallum, and Ronald Rosenfeld, "Learning Hidden Markov Model Structure for Information Extraction," AAAI Workshop, 1999.

Marios Skounakis, Mark Craven and Soumya Ray, "Hierarchical Hidden Markov Models for Information Extraction," Proceedings of the 18th International Joint Conference on Artificial Intelligence, Acapulco, Mexico, Morgan Kaufmann, 2003.

Trausti Krist Jansson, Aron Culotta, Paul Viola and Andrew McCallum, "Interactive Information Extraction with Constrained Conditional Random Fields," American Association for Artificial Intelligence, 2004.

Sheila Tejada, Craig A. Knoblock and Steven Minton, "Learning Domain-Independent String Transformation Weights for High Accuracy Object Identification," SIGKDD Jul. 2002 Edmonton Alberta, Canada.

Jiyang Wang and Fred H. Lochovsky, "Data Extraction and Label Assignment for Web Databases," WWW 2003, Budapest, Hungary, ACM.

J. Wang, J.-R. Wen, F.H. Lochovsky and W.-Y. Ma, "Instance-based Schema Matching for Web Databases by Domain-specific Query Probing," Proceedings of the 30th VLDB Conference, Toronto, Canada, 2004.

Yalin Wang and Jianying Hu, "A Machine Learning Based Approach for Table Detection on the Web," In WWW 2002.

Ben Wellner, Andrew McCallum, Fuchun Peng and Michael Hay, "An Integrated, Conditional Model of Information Extraction and Coreference with Application to Citation Matching," In Conference on Uncertainty in Artificial Intelligence (UAI), 2004.

Shipeng Yu, Deng Cai, Ji-Rong Wen and Wei-Ying Ma, "Improving Pseudo-Relevance Feedback in Web Information Retrieval Using Web Page Segmentation," WWW 2003, Budapest, Hungary, ACM.

Jiawei Han and Micheline Kamber, "Data Mining Concepts and Techniques," Chapter 7, Classification and Prediction, Morgan Kaufmann Publishers, Academic Press 2001, pp. 279-333.

Jorge Nocedal and Stephen J. Wright, "Numerical Optimization," Chapter 9, Large-Scale Quasi-Newton and Partially Separable Optimization, Springer-Verlag New York, Inc. 1999, pp. 223-249.

J.N. Darroch and D. Ratcliff, The Annals of Mathematical Statistics, "Generalized Iterative Scaling for Log-Linear Models," 1972, vol. 43, No. 5, pp. 1470-1480.

* cited by examiner

METHOD AND SYSTEM FOR IDENTIFYING OBJECT INFORMATION

TECHNICAL FIELD

The described technology relates generally to identifying object information in object blocks and particularly to identifying such information from information pages such as web pages.

BACKGROUND

Web pages accessible via the Internet contain a vast amount of information. A web page may contain information about various types of objects such as products, people, papers, organizations, and so on. For example, one web page may contain a product review of a certain model of camera, and another web page may contain an advertisement offering to sell that model of camera at a certain price. As another example, one web page may contain a journal article, and another web page may be the homepage of an author of the journal article. A person who is searching for information about an object may need information that is contained in different web pages. For example, a person who is interested in purchasing a certain camera may want to read reviews of the camera and to determine who is offering the camera at the lowest price.

To obtain such information, a person would typically use a search engine to find web pages that contain information about the camera. The person would enter a search query that may include the manufacturer and model number of the camera. The search engine then identifies web pages that match the search query and presents those web pages to the user in an order that is based on how relevant the content of the web page is to the search query. The person would then need to view the various web pages to find the desired information. For example, the person may first try to find web pages that contain reviews of the camera. After reading the reviews, the person may then try to locate a web page that contains an advertisement for the camera at the lowest price.

The person viewing the web pages would typically like to know whether the web pages contain information for the same object. For example, a person would like to know whether a certain product review and a certain product advertisement are for the same object. In the example of a camera, a person would like to know which reviews and products are for the camera of interest. It can, however, be difficult for the person viewing the web pages to determine whether a review and an advertisement are for the same product. In many cases, a web page does not include a unique identifier for the product for which it is providing information. For example, a product review may identify the manufacturer and model of a camera, but not a sub-model number, and an advertisement may identify the manufacturer, but only include a general description of the camera. A person viewing the product review and the advertisement may not be able to ascertain whether they are for the same camera.

It would be desirable to have a technique that would automatically identify when information of web pages relates to the same object. The knowledge that different sources of information relate to the same object can be used in many different applications. For example, a search engine may use the knowledge to determine the relevance of or to group the web pages of the results. As another example, a shopping portal may use the knowledge to identify the web-based vendor with the lowest purchase price. As another example, a repository of scientific papers may use the knowledge to identify additional information about the authors of the papers.

SUMMARY

A method and system for identifying object information of an information page is provided. An information extraction system identifies the object blocks of an information page. An object block is a collection of information that relates to a single object. The extraction system classifies the object blocks into object types. Each object type has associated attributes that define a schema for the information of the object type. The extraction system identifies object elements within an object block that may represent an attribute value for the object. The extraction system may use visual features (e.g., font size and separating lines) of an information page to help identify the object elements. After the object elements are identified, the extraction system attempts to identify which object elements correspond to which attributes of the object type in a process referred to as "labeling." The extraction system uses an algorithm to determine the confidence that a certain object element corresponds to a certain attribute. The extraction system then selects the set of labels with the highest confidence as being the labels for the object elements. The extraction system may use an object data store to assist in labeling the object elements. An object data store may contain an entry for each object of a certain object type. When determining the confidence in a labeling of an object element, the extraction system may compare that object element to the attribute values within the object data store. If an object element matches attribute values of the entries, then it is more likely a correct labeling. The extraction system may use the object elements with their labels to identify the object of the object data store to which the object elements correspond. The extraction system may use the knowledge of the match to help label other object elements.

DETAILED DESCRIPTION

Figure 1:
FIG. 1 is a diagram illustrating object blocks and object elements of a web page.

A method and system for identifying object information of an information page is provided. In one embodiment, the information extraction system identifies the object blocks of an information page. An object block is a collection of information that relates to a single object. For example, an advertisement for a camera may be an object block and the matching object is the uniquely identified camera. The extraction system classifies the object blocks into object types. For example, an object block that advertises a camera may be classified as a product type, and an object block relating to a journal paper may be classified as a paper type. Each object type has associated attributes that define a schema for the information of the object type. For example, a product type may have attributes of manufacturer, model, price, description, and so on. A paper type may have attributes of title, author, publisher, and so on. The extraction system identifies object elements within an object block that may represent an attribute value for the object. For example, the object elements of an advertisement of a camera may include manufacturer, model, and price. The extraction system may use visual features (e.g., font size and separating lines) of an information page to help identify the object elements. After the object elements are identified, the extraction system attempts to identify which object elements correspond to which attributes of the object type in a process referred to as "labeling." For example, the extraction system may identify that the object element "Sony" is a manufacturer attribute and the object element "$599" is a price attribute. The extraction system uses an algorithm to determine the confidence that a certain object element corresponds to a certain attribute. The extraction system then selects the set of labels with the highest confidence as being the labels for the object elements. In this way, the extraction system can automatically identify information of an object.

In one embodiment, the extraction system uses an object data store to assist in labeling the object elements. An object data store may contain an entry for each object of a certain object type. For example, a product data store may contain an entry for each unique product. Each entry of a product data store contains the attribute values for the attributes of the object to which the entry corresponds. For example, an entry for a camera may have the value of "Sony" for its manufacturer attribute. The object data store may be a pre-existing data store, such as a product database, or may be created dynamically as the extraction system identifies objects. When determining the confidence in a labeling of an object element, the extraction system may compare that object element to the attribute values within the object data store. For example, the extraction system may determine that the object element "Sony" is more likely a manufacturer attribute because it matches many of the attribute values of the manufacturer attribute in the product data store. The labeling of one object element may depend on the labeling of another object element. For example, if the extraction system is confident that the object element "Sony" is a manufacturer attribute, then the extraction system may not label any other object element with the manufacturer attribute. The extraction system may use feature functions defined for a specific object type that score the likelihood that an object element corresponds to a certain attribute.

In one embodiment, the extraction system may use the object elements with their labels to identify the object of the object data store to which the object elements correspond. For example, if the extraction system labels the object element "Sony" as a manufacturer attribute and the object element "DVS-V1" as a model attribute, then the extraction system may be able to identify an entry of the object data store that has the same attribute values. In such a case, the extraction system may assume that the object elements match the object of that entry. The extraction system can use the knowledge of the match to help label other object elements. For example, the knowledge of the matching object may be used to help identify the object element "CD-1" as a battery attribute. The extraction system can also update the information of the entry based on the object elements. For example, if an object element indicates that the price of the camera is $549.95 and the previous lowest price was $599, then the extraction system may update a lowest-price attribute and a corresponding vendor attribute. If the extraction system is unable to identify a matching object, then the extraction system may add a new entry to the object data store. The extraction system may assume a match between object elements and an entry when the object elements match on certain key attributes such as those that uniquely identify an object.

FIG. 1 is a diagram illustrating object blocks and object elements of a web page. Web page 100 includes object blocks 110-140. In this example, each object block is delimited by a rectangle. Each object block is an advertisement for a specific Sony camera. For example, object block 140 is an advertisement for a "Sony DSC-V1" camera. Object block 140 includes object elements 141-145. The extraction system identified the object elements based on text and visual characteristics. The extraction system may prefer to identify large object elements that correspond to a single attribute because it may allow for better feature functions to be developed because the expression ability of an object element is generally proportional to its length and the extraction efficiency can be improved because more text can be labeled together. The extraction system may use different heuristics to identify object elements based on object type and source type. For example, a product review and an advertisement are different source types and may represent their object elements differently. As such, the extraction system may apply a heuristic that is specific to the source type. The extraction system may also use visual information to help guide the labeling. For example, an object element of an object of paper type that is in the maximum font size and is centered at the top of a page is likely the title of the paper.

Figure 2:
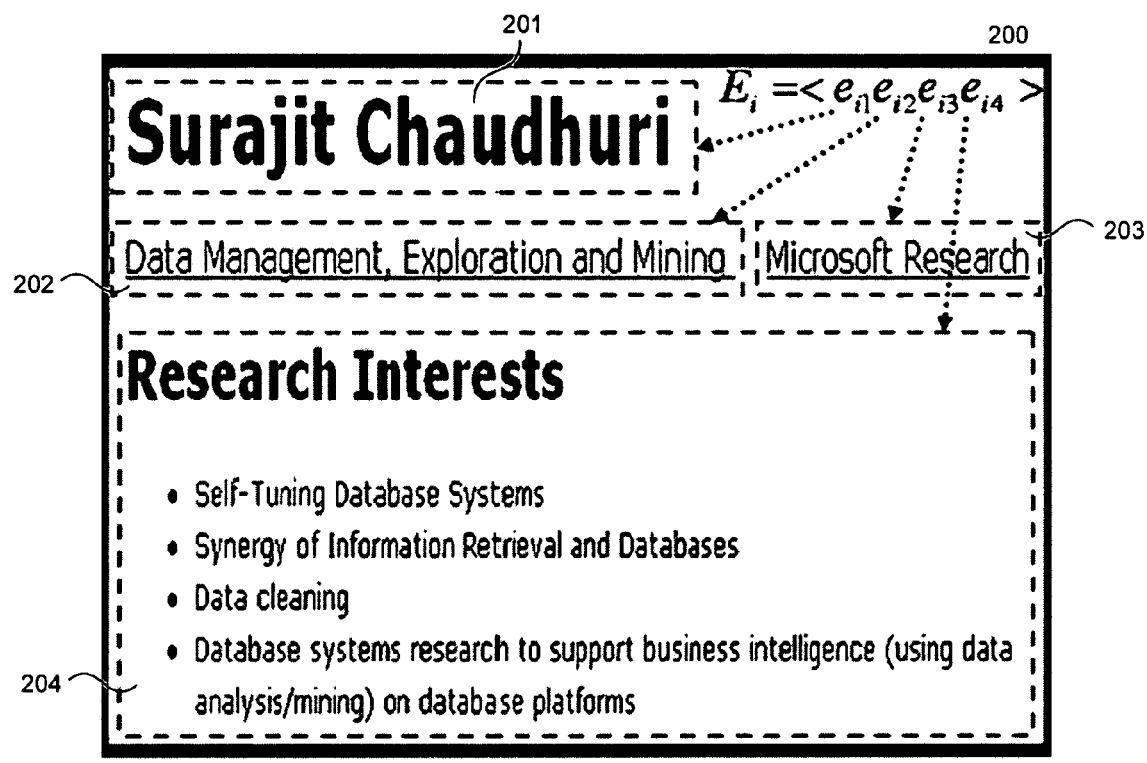
FIG. 2 is a diagram that illustrates object elements of an object block.

FIG. 2 is a diagram that illustrates object elements of an object block. Object block 200 includes object elements 201-204. The object elements for an object block can be represented by the vector $E=<e_1 e_2 \ldots e_T>$, where T is the number of object elements. In this example, the extraction system identified the object block 200 from the homepage of Surajit Chaudhuri. The extraction system applied a heuristic that identified the research interests as a single object element 204.

In one embodiment, the extraction system uses a Conditional Random Fields ("CRF") model to label the object elements. A CRF model is an undirected graphical model trained to maximize a conditional probability, as described in J. Lafferty, A. McCallum, and F. Pereira, "Conditional Random Fields: Probabilistic Models for Segmenting and Labeling Sequence Data," ICML 2001. Given an object element (observation) sequence $E=<e_1 e_2 \ldots e_T>$ derived from an object block, a CRF model models a conditional probability for a label (state) sequence $L=<l_1 l_2 \ldots l_T>$ where $l_i$ belongs to a finite attribute alphabet $A=\{a_1, a_2, \ldots a_m\}$, by the following equation:

$$P(L|E, \Theta) = \frac{1}{Z_E} \exp\left\{\sum_{t=1}^{T}\sum_{k=1}^{N} \lambda_k f_k(l_{t-1}, l_t, E, t)\right\} \quad (1)$$

where $Z_E$ is a normalization constant that makes the probabilities of all possible label sequences sum to one, $f_k(l_{t-1}, l_t, E, t)$ is called a feature function that measures an arbitrary feature about the event that a transition $l_{t-1} \to l_t$ occurs at current time t and the object element sequence is E, and $\Theta = \{\lambda_1, \lambda_2, \ldots \lambda_N\}$ is a parameter set or weights of the model that indicate the relative importance of each feature function.

A first step in constructing a CRF model is to define the attribute and feature functions of each object type. A feature function returns an indication of the confidence that a certain label is the correct label for an object element given a label for the prior object element. For example, a feature function may specify that an object element that contains a currency symbol ("$") is a price attribute with a high degree of confidence. The second step is to learn the feature function parameters or weights using training data and various training models, such as L-BFGS as described in J. Nocedal and S. Wright, "Numerical Optimization," Springer, 1999, which is hereby incorporated by reference. The training data consist of object blocks with labeled object elements. The training algorithm identifies the weights that best map the values of the feature functions to the labeled object elements.

After the CRF model is trained, the extraction system determines the optimal label sequence with the highest probability as represented by the following equation:

$$L^* = \underset{L}{\operatorname{argmax}} \, P(L|E, \Theta) \quad (2)$$

The extraction system solves this equation using the well-known Viterbi algorithm, which can be represented by the following equation:

$$\delta_t(l) = \max_{l'} \left\{ \delta_{t-1}(l') \exp\left[\sum_{k=1}^{N} \lambda_k f_k(l', l, E, t)\right] \right\} \quad (3)$$

where $\delta_t(l)$ is the best score (highest probability) along a single path at time t, which accounts for the first t elements and ends in label $l_t$. After the recursion terminates at time T, the optimal labeling is represented by the following equation:

$$l^* = \underset{l}{\operatorname{argmax}} [\delta_T(l)] \quad (4)$$

where L* can be identified by backtracking the recorded dynamic programming table generated by the Viterbi algorithms.

In one embodiment, the extraction system uses an enhanced CRF model that factors in information of an object data store for objects of the same object type as that of the object block and visual information of the object elements. The extraction system represents the enhanced CRF model by the following equation:

$$P(L|E, D, \Theta) = \frac{1}{Z_E} \exp\left\{\sum_{t=1}^{T} \sum_{k=1}^{N} \lambda_k f_k(l_{t-1}, l_t, E, D, t)\right\} \quad (5)$$

where E represents the object element sequence that contains both text and visual information (e.g., font size), D represents the object data stores that store structured information, and $f_k(l_{t-1}, l_t, E, D, t)$ represents the feature function.

The extraction system compares the object elements to the attribute values of the entries of the object data store to help identify the confidence for a labeling. If the confidence in a labeling is high enough, the extraction system uses a modified induction formula as represented by the following equation:

$$\delta_t(l) = \begin{cases} \max_{l'} \left\{ c_t(a_i) \cdot \delta_{t-1}(l') \exp\left[\sum_{k=1}^{N} \lambda_k f_k(l', l, E, D, t)\right] \right\} & l = a_i \\ \max_{l'} \left\{ (1 - c_t(a_i)) \cdot \delta_{t-1}(l') \exp\left[\sum_{k=1}^{N} \lambda_k f_k(l', l, E, D, t)\right] \right\} & \text{others} \end{cases} \quad (6)$$

where $c_t(a_i)$ is the confidence that $a_i$ is the correct label for $e_t$. The extraction system uses equation 5 when $(c_t(a_i) > \tau)$. Otherwise, it uses equation 3.

Figure 3:
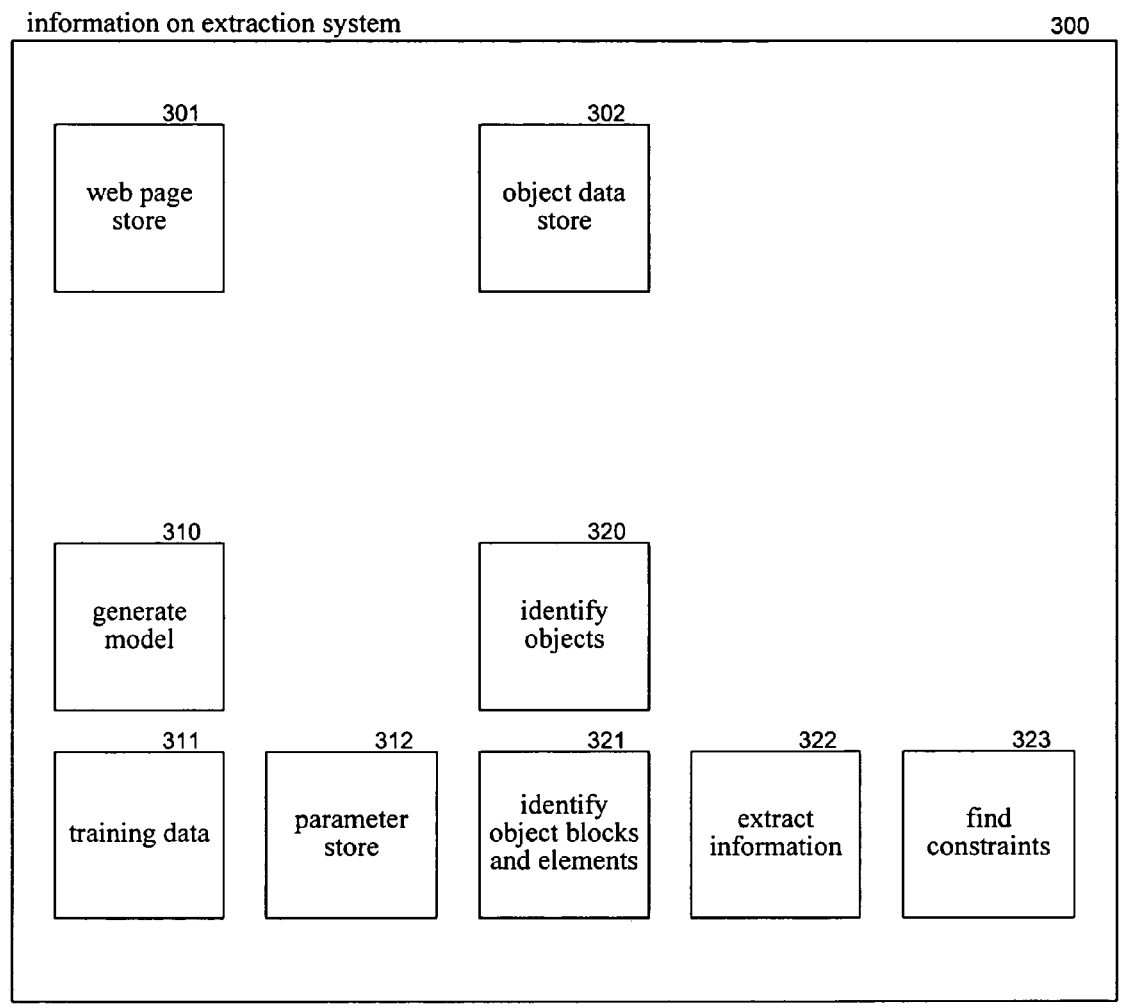
FIG. 3 is a block diagram that illustrates components of the extraction system in one embodiment.

FIG. 3 is a block diagram that illustrates components of the extraction system in one embodiment. The extraction system 300 includes web page store 301 and object data store 302. The web page store contains web pages collected from crawling the web. The object data store contains object information for various object types. Each object type may be represented by a table with columns representing attributes and rows representing unique objects. The object data store may be a pre-existing database such as a product database or may be a database that is dynamically created by the extraction system. The generate model component 310 generates the CRF model using the training data of training data store 311. The generate model component stores the parameters or weights in the parameters store 312. The identify objects component 320 is passed a web page, identifies and classifies the object blocks, identifies the object elements within the object blocks, labels the object elements, and identifies the matching object from the object data store, if any. The identify objects component invokes the identify object blocks and elements component 321 to identify and classify the object blocks and identify the object elements within each object block. The identify objects component invokes the extract information component 322 to label the object elements. The extract information component invokes the find constraints component 323 to identify constraints on a labeling based on confidence that certain object elements correspond to certain attributes.

The computing device on which the extraction system is implemented may include a central processing unit, memory, input devices (e.g., keyboard and pointing devices), output devices (e.g., display devices), and storage devices (e.g., disk drives). The memory and storage devices are computer-readable media that may contain instructions that implement the extraction system. In addition, the data structures and message structures may be stored or transmitted via a data transmission medium, such as a signal on a communications link. Various communications links may be used, such as the Internet, a local area network, a wide area network, or a point-to-point dial-up connection.

The extraction system may be implemented in various operating environments. Various well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The extraction system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
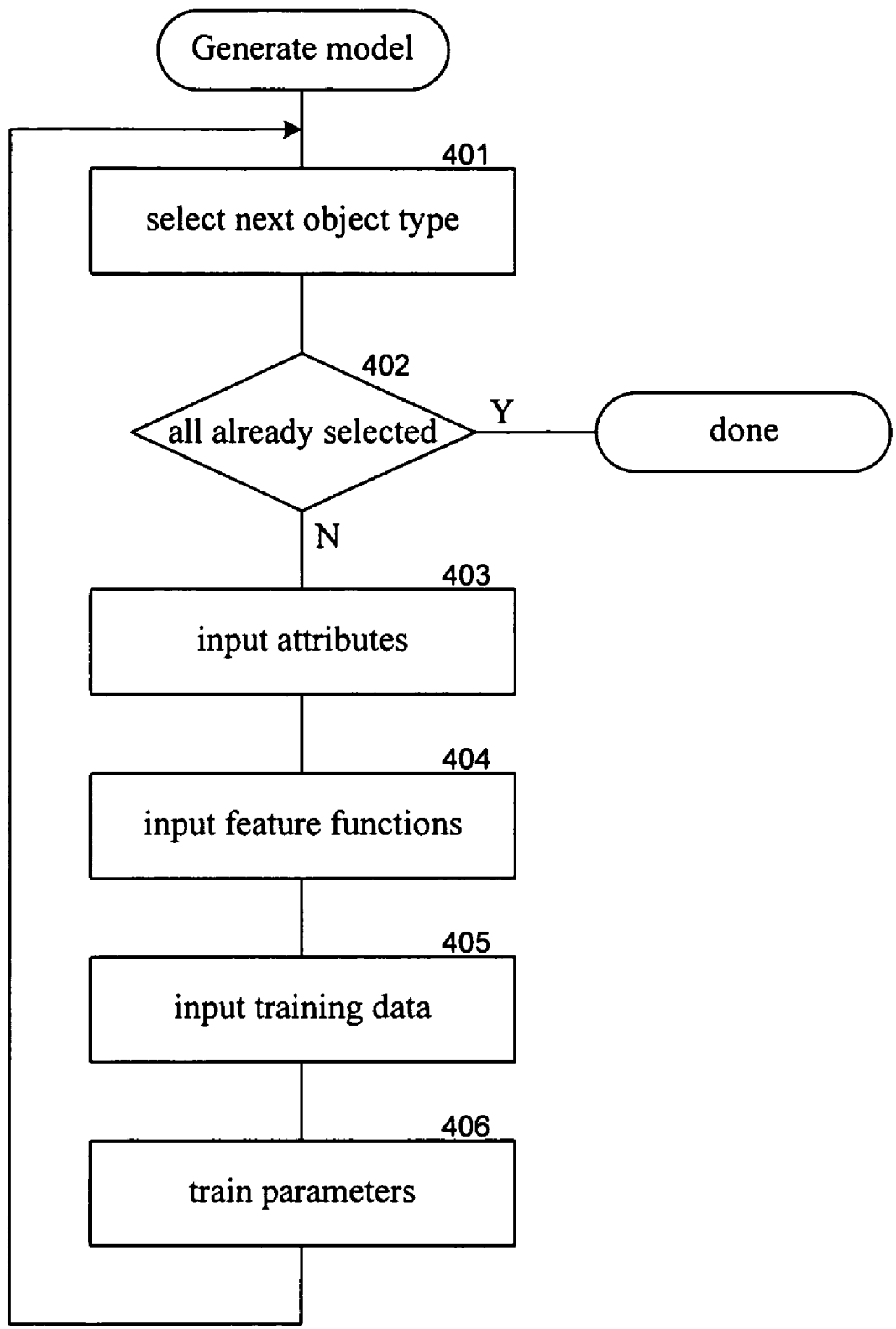
FIG. 4 is a flow diagram that illustrates the processing of the generate model component in one embodiment.

FIG. 4 is a flow diagram that illustrates the processing of the generate model component in one embodiment. The component generates models for various object types. In block 401, the component selects the next object type. In decision block 402, if all the object types have already been selected, then the component completes, else the component continues at block 403. In block 403, the component inputs from a user the set of attributes for the selected object type. In block 404, the component inputs from a user the definition of the feature functions for the selected object type. In block 405, the component inputs the training data for the selected object type. In block 406, the component learns the weights for the feature functions using the training data. The component then loops to block 401 to select the next object type.

Figure 5:
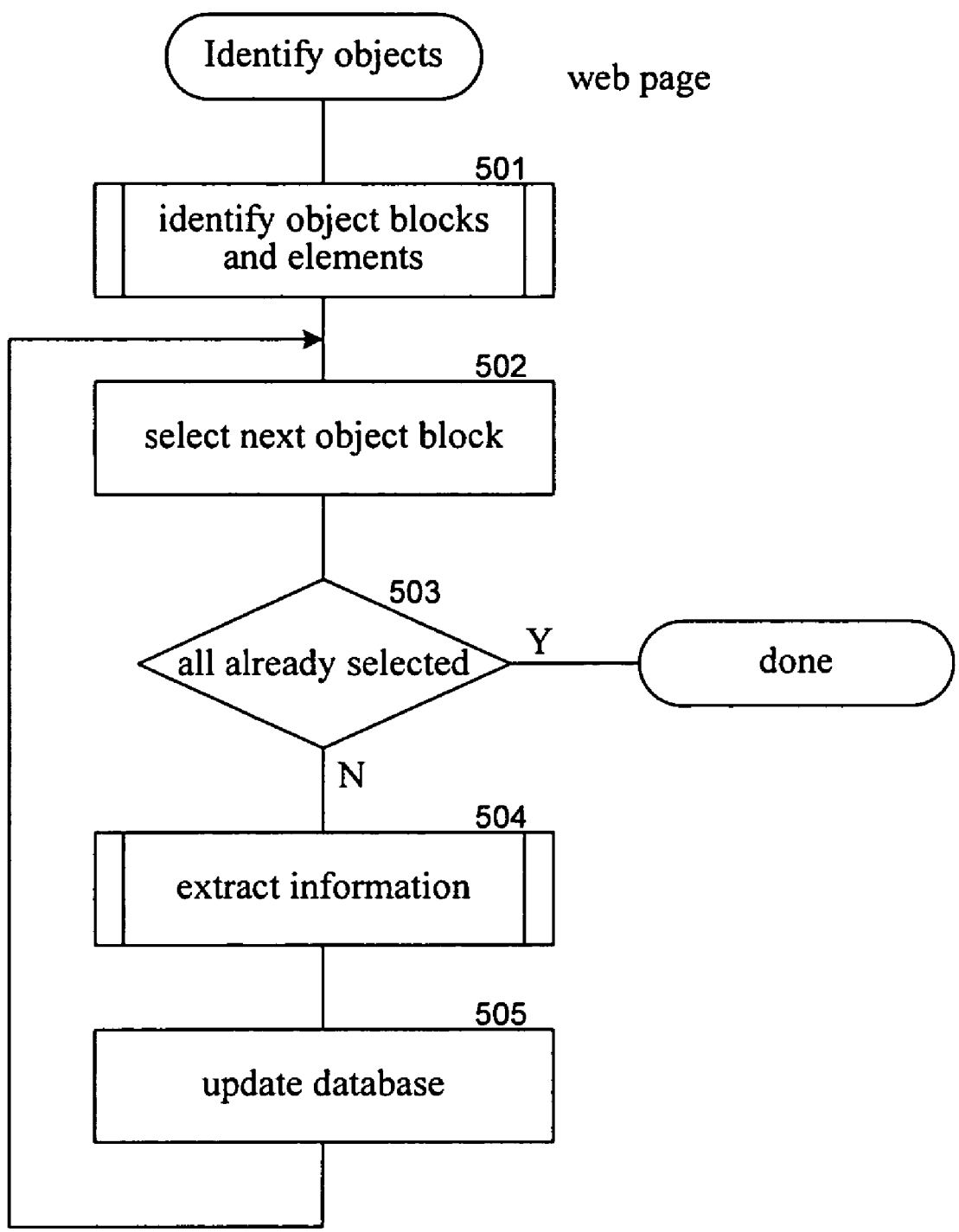
FIG. 5 is a flow diagram that illustrates the processing of the identify objects component of the extraction system in one embodiment.

FIG. 5 is a flow diagram that illustrates the processing of the identify objects component of the extraction system in one embodiment. The component is passed a web page. In block 501, the component invokes the identify object blocks and elements component. In blocks 502-505, the component loops extracting information for each object block. In block 502, the component selects the next object block. In decision block 503, if all the object blocks have already been selected, then the component completes, else the component continues at block 504. In block 504, the component invokes the extract information component. In block 505, the component updates the object data store to add an entry or update an existing entry. The component then loops to block 502 to select the next object block.

Figure 6:
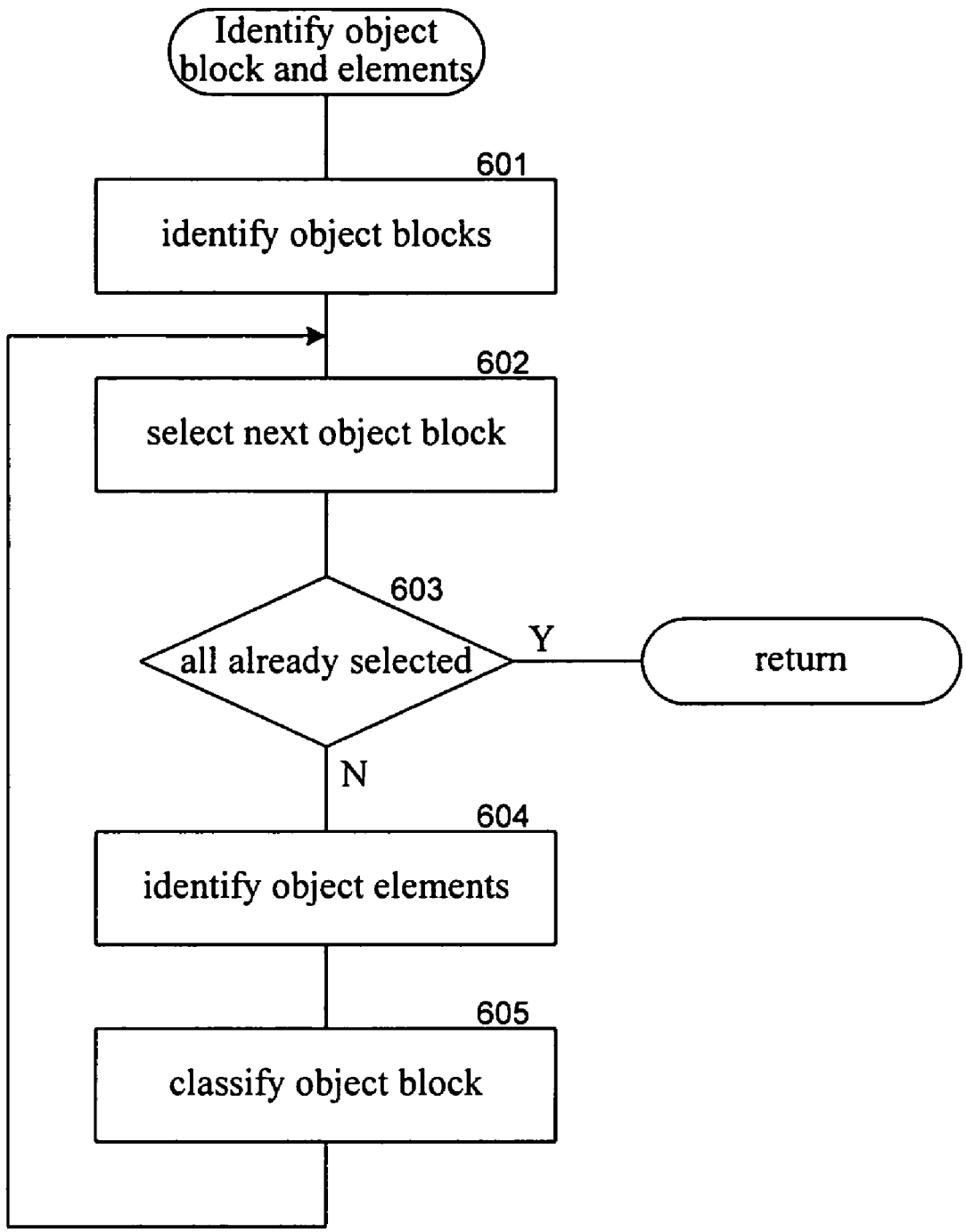
FIG. 6 is a flow diagram that illustrates the processing of the identify object blocks and elements component in one embodiment.

FIG. 6 is a flow diagram that illustrates the processing of the identify object blocks and elements component in one embodiment. The component is passed a web page, identifies the object blocks and object elements, and classifies the object blocks. In block 601, the component identifies the object blocks of the web page. In blocks 602-605, the component loops identifying object elements of, and classifying, the object blocks. In block 602, the component selects the next object block. In decision block 603, if all the object blocks of the web page have already been selected, then the component returns, else the component continues at block 604. In block 604, the component identifies the object elements of the selected object block. In block 605, the component classifies the selected object block and then loops to block 602 to select the next object block.

Figure 7:
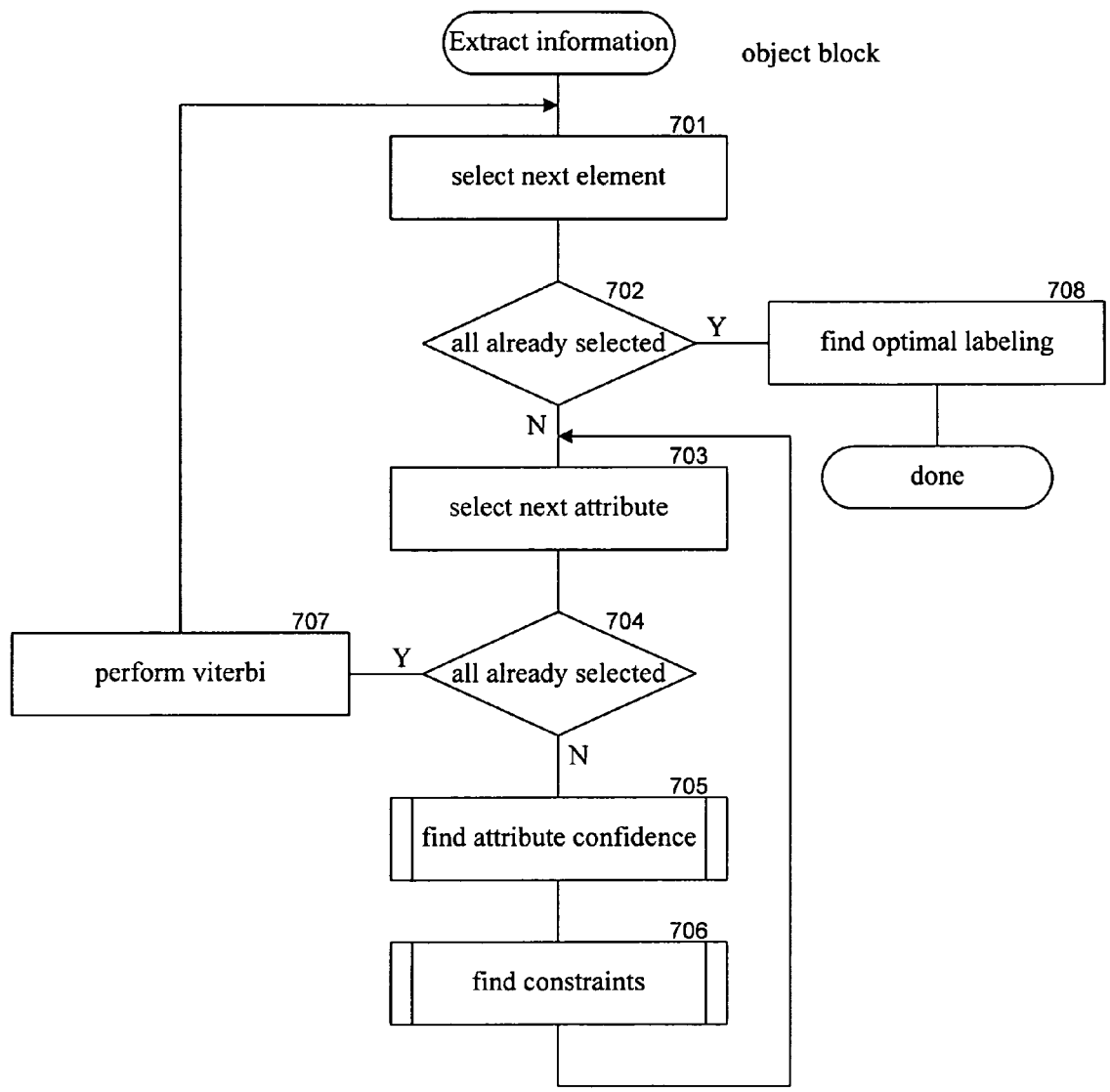
FIG. 7 is a flow diagram that illustrates the processing of the extract information component of the extraction system in one embodiment.

FIG. 7 is a flow diagram that illustrates the processing of the extract information component of the extraction system in one embodiment. The component is passed an object block and returns an indication of whether the object block corresponds to an object in the object data store. In block 701, the component selects the next object element of the passed object block. In decision block 702, if all the object elements have already been selected, the component continues at block 708, else the component continues at block 703. In blocks 703-706, the component loops processing each attribute for the selected object element. In block 703, the component selects the next attribute. In decision block 704, if all the attributes have already been selected, then the component continues at block 707, else the component continues at block 705. In block 705, the component invokes a find attribute confidence component to determine the confidence that the selected attribute is a correct label for the selected object element. In block 706, the component invokes the find constraints component to establish constraints based on the confidence of the selected attribute. The component then loops to block 703 to select the next attribute. In block 707, the component performs the Viterbi algorithm using the confidence and constraints for all the object elements that have already been selected and then loops to block 701 to select the next object element. The newly added constraints may affect the labeling of the previously selected object elements. In block 708, the component finds the optimal labeling by backtracking through the dynamic programming table.

Figure 8:
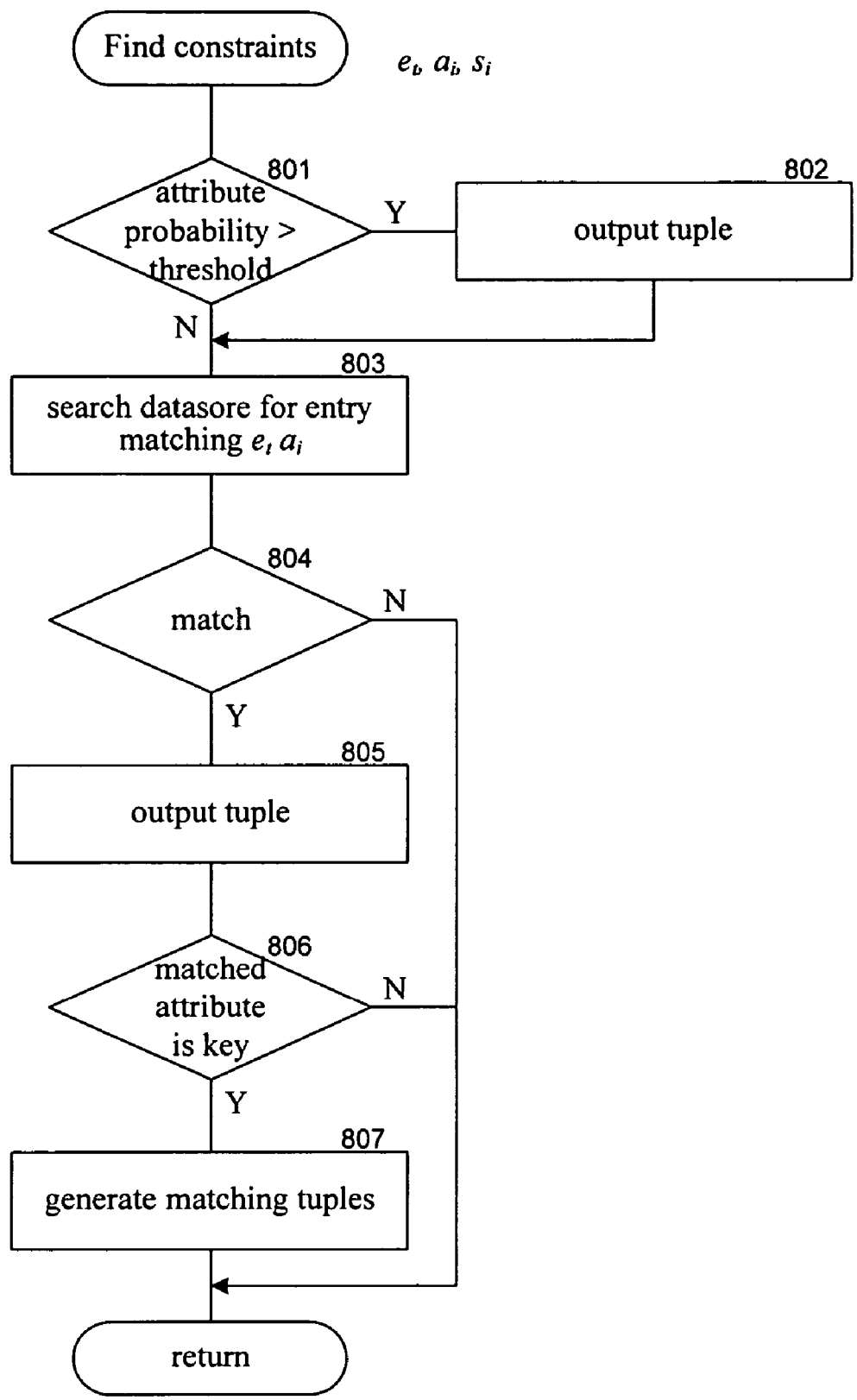
FIG. 8 is a flow diagram that illustrates the processing of the find constraints component of the extraction system in one embodiment.

FIG. 8 is a flow diagram that illustrates the processing of the find constraints component of the extraction system in one embodiment. The component is passed a confidence that a certain attribute is the correct label for a certain object element. If the confidence $s_i$ that the object element $e_t$ is certain attribute $a_i$ is high enough ($s_i \geq \tau$), where $\tau$ is a preset threshold, the extraction system assumes $s_i$ as the constraint confidence $c_t(a_i)$ and records a tuple $<e_t, a_i, c_t(a_i)>$. If the extraction system finds a good match for object element $e_1$ with the attribute $a_i$ of an entry in the object data store, the extraction system assumes a normalized matching degree $m_i$ (in the range of [0~1]) as the confidence $c_t(a_i)$. If $c_t(a_i) \leq \tau$, then the extraction system records the tuple $<e_t, a_i, c_t(a_i)>$. If the matched attribute is a key attribute of the entry, the extraction system inversely browses E to compute the normalized matching degree $P_j$ for each attribute $a_j$ of the entry and computes the probability $P_O$ that the object block matches the object of the entry. For each attribute $a_j$, if $P_j \geq \tau$, the extraction system assumes the bigger of $P_j$ and $P_O$ as the confidence $c_t'(a_j)$ and records a tuple $<e_t, a_j, c_t(a_j)>$, where $t' \in \{1,2,\ldots T\}$. For all $t' \geq t$, the extraction system selects the tuple $<o_t, l_t^*, c_t(a_i)^*>$ with the highest confidence. The extraction system then re-performs the searching process using the modified Viterbi algorithm starting from the smallest time t' and ending at the current time t. In decision block 801, if the confidence is greater than a threshold, then the component outputs the tuple in block 802, else the component continues at block 803. In block 803, the component searches the object data store for an entry in which the passed object element matches the passed attribute. In decision block 804, if a matching entry was found, then the component continues at block 805, else the component returns. In block 805, the component outputs the tuple. In decision block 806, if the matched attribute is a key (i.e., uniquely identifies the object), then the component continues at block 807, else the component returns. In block 807, the component generates and outputs tuples based on the knowledge that the object elements match the entry as described above. The component then returns.

Figure 9:
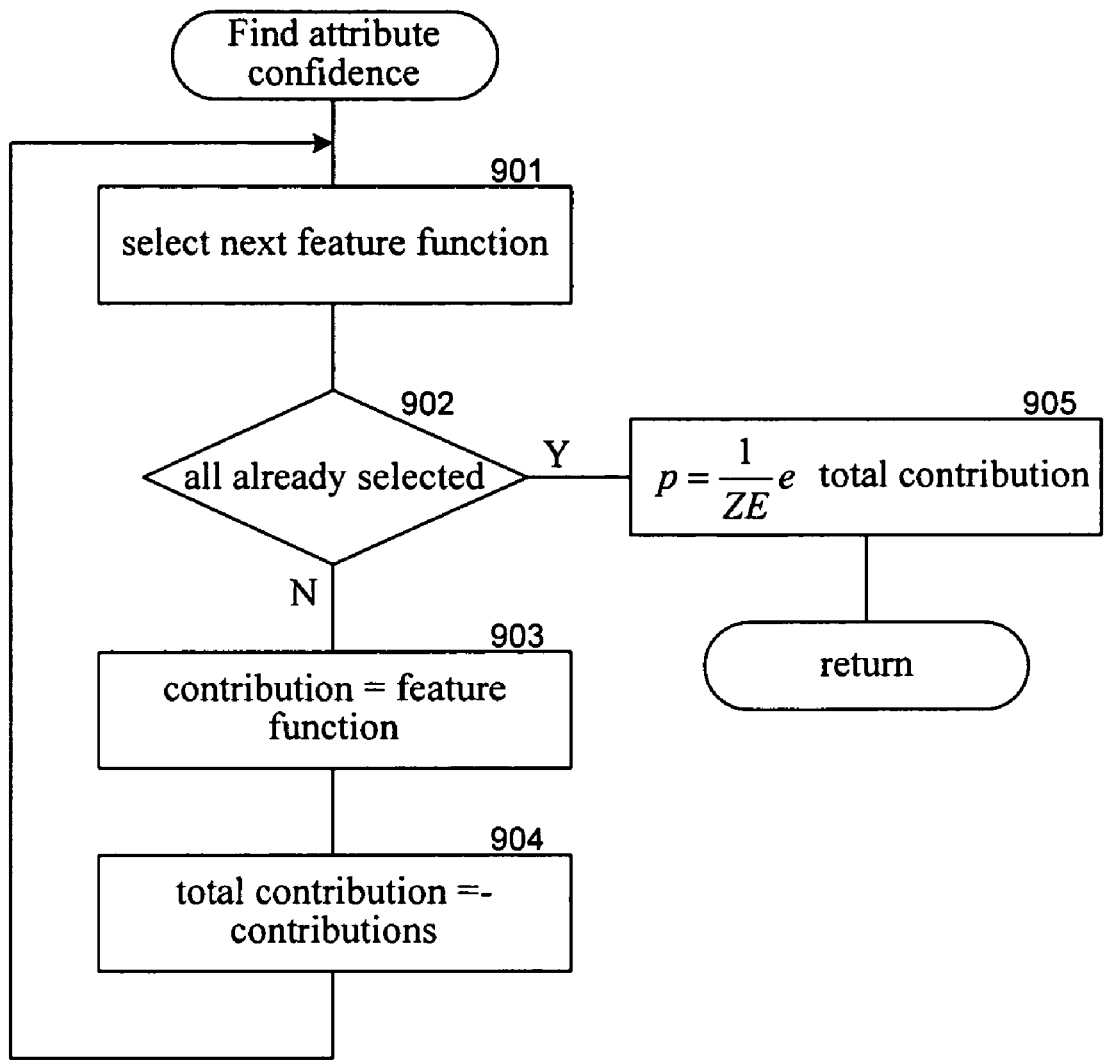
FIG. 9 is a flow diagram that illustrates the processing of the find attribute confidence component in one embodiment.

FIG. 9 is a flow diagram that illustrates the processing of the find attribute confidence component in one embodiment. In blocks 901-904, the component loops computing the value of each feature function. In block 901, the component selects the next feature function for the object type. In decision block 902, if all the feature functions have already been selected, then the component continues at block 905, else the component continues at block 903. In block 903, the component sets the contribution to the value returned by the computed feature function. In block 904, the component totals the contributions of the feature functions and loops to block 901 to select the next feature function. In block 905, the component calculates a confidence or probability based on the total contribution and returns.

One skilled in the art will appreciate that although specific embodiments of the extraction system have been described herein for purposes of illustration, various modifications may be made without deviating from the spirit and scope of the invention. The extraction system may identify object blocks using visual separators such as lines, blank areas, images, fonts, and color. A suitable block identification technique is described in D. Cai, S. Yu, J.-R. Wen, and W.-Y. Ma., "Block-Based Web Search," ACM SIGIR Conference 2004. The blocks can be classified using techniques described in J. Han and M. Kamber, "Data Mining: Concepts and Techniques," Morgan Kaufman Publishers, 2000, and B. Liu, R. Grossman, and Y. Zhai, "Mining Data Record in Web Pages," ACM SIGKDD International Conference on Knowledge Discovery and Data Mining 2003. All these references are hereby incorporated by reference. Accordingly, the invention is not limited except as by the appended claims.

We claim:

1. A method in a computer system for identifying an object of an information page, the method comprising:
    identifying an object block of the information page representing the object;
    identifying object elements of the identified object block;
    classifying the object block as an object type, the object type having attributes;
    labeling the identified object elements as attributes of the object type;
    providing an object data store having objects of the object type;
    determining whether the object matches an object of the object data store based on the labeling of the object elements;
    when the determining indicates a match, updating the matching object of the object data store based on the labeling of the object elements; and
    when the determining does not indicate a match, adding an object to the object data store based on the labeling of the object elements.

2. The method of claim 1 wherein the object elements are identified based on visual aspects of the information page.

3. The method of claim 1 including providing an object data store having objects of the object type and wherein the labeling includes comparing the object elements to attribute values of the objects of the object data store.

4. The method of claim 3 wherein the comparing includes generating constraints based on likelihood that an object element should be labeled as an attribute.

5. The method of claim 1 wherein the labeling is based on a conditional random fields model.

6. The method of claim 5 wherein the conditional random fields model has feature functions that indicate confidence that an object element should be labeled with a certain attribute.

7. The method of claim 6 wherein a feature function is enhanced to factor in comparison of an object element to attribute values of an object of an object data store.

8. The method of claim 6 including learning weights for the feature functions.

9. The method of claim 5 wherein the labeling applies a Viterbi algorithm.

10. The method of claim 9 wherein the Viterbi algorithm is modified to factor in confidence that an object element should be labeled with a certain attribute.

11. A computer-readable medium containing computer-executable instructions for controlling a computer system to identify an object of an object block, by a method comprising:
    identifying object elements of the object block, the object block having an object type with attributes;
    labeling the identified object elements as attributes of the object type, the labeling including comparing the identified object elements to attribute values of objects of an object store;
    determining whether the object matches an object of the object data store based on the labeling of the object elements;
    when the determining indicates a match, updating the matching object of the object data store based on the labeling of the object elements; and
    when the determining does not indicate a match, adding an object to the object data store based on the labeling of the object elements.

12. The computer-readable medium of claim 11 wherein the object elements are identified based on visual aspects of the object block.

13. The computer-readable medium of claim 11 wherein the labeling includes generating constraints based on confidence that an object element should be labeled as an attribute.

14. The computer-readable medium of claim 11 wherein the labeling is based on a conditional random fields model with feature functions that indicate confidence that an object element should be labeled with a certain attribute, wherein a feature function factors in a comparison of an object element to attribute values of an object of an object data store.

15. The computer-readable medium of claim 14 wherein the labeling applies a Viterbi algorithm that factors in confidence that an object element should be labeled with a certain attribute.

16. A computer-readable medium containing computer-executable instructions for controlling a computer system to label object elements of an object block, by a method comprising:
    providing an object data store of objects having attributes;
    determining labels for the object elements by comparing the object elements to attribute values of objects of the object store and generating constraints based on confidence that an object element should be labeled as an attribute;
    determining whether the object of the object block matches an object of the object data store based on the determined labels of the object elements;
    when the determining indicates a match, updating the matching object of the object data store based on the determined labels of the object elements; and
    when the determining does not indicate a match, adding an object to the object data store based on the determined labels of the object elements.

17. The computer-readable medium of claim 16 wherein the labeling is based on a conditional random fields model with feature functions that indicate confidence that an object element should be labeled with a certain attribute, wherein a feature function factors in a comparison of an object element to attribute values of an object of the object data store.

18. The computer-readable medium of claim 17 wherein the labeling applies a Viterbi algorithm that factors in confidence that an object element should be labeled with a certain attribute.

* * * * *